(12) United States Patent
Fujimura

(10) Patent No.: US 7,239,102 B2
(45) Date of Patent: Jul. 3, 2007

(54) PHASE ADJUSTMENT CIRCUIT, MOTOR DRIVING CONTROL CIRCUIT, AND MOTOR APPARATUS

(75) Inventor: Takashi Fujimura, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 333 days.

(21) Appl. No.: 11/064,879

(22) Filed: Feb. 24, 2005

(65) Prior Publication Data

US 2005/0184700 A1    Aug. 25, 2005

(30) Foreign Application Priority Data

Feb. 25, 2004    (JP) ............................. 2004-048959

(51) Int. Cl.
*H02P 7/00* (2006.01)
(52) U.S. Cl. ...................... 318/432; 318/434; 318/254; 318/138; 318/439; 318/808
(58) Field of Classification Search ................ 318/432, 318/434, 254, 138, 439, 808
See application file for complete search history.

(56) References Cited

U.S. PATENT DOCUMENTS

| | | | | |
|---|---|---|---|---|
| 4,629,959 A | * | 12/1986 | Okuyama et al. | ........... 318/727 |
| 5,723,957 A | * | 3/1998 | Ishikawa | ..................... 318/254 |
| 6,091,216 A | * | 7/2000 | Takahashi et al. | .......... 318/254 |
| 6,710,572 B2 | | 3/2004 | Okubo | ....................... 318/727 |
| 6,969,962 B2 | * | 11/2005 | Oe | .............................. 318/254 |

FOREIGN PATENT DOCUMENTS

| | | |
|---|---|---|
| JP | 2002-084772 | 3/2002 |
| JP | 2003-111481 | 4/2003 |

* cited by examiner

*Primary Examiner*—Rita Leykin
(74) *Attorney, Agent, or Firm*—Keating & Bennett, LLP

(57) ABSTRACT

A motor apparatus is constructed to compensate for a delay in operation of the motor apparatus, so that the efficiency is improved and noise is reduced over a broad motor rpm range by driving the motor at the optimum timing. The motor driving control circuit of the motor apparatus includes a phase adjustment circuit which inputs signals of the U phase, V phase and W phase output by rotational position signal amplifiers, and performs an adjustment for the respective signals so that the phases are arbitrarily advanced by a ratio corresponding to phase adjustment voltages, an automatic gain control circuit which inputs the output signals of this circuit and the gain of which is feedback-controlled according to the driving currents of the armature coils of the motor, an FG circuit which produces a periodic pulse train from the rotational position signals, and a frequency-voltage conversion circuit which performs a conversion to a voltage corresponding to the frequency of the pulse train, and outputs the converted voltage as a phase adjustment voltage.

20 Claims, 4 Drawing Sheets

PHASE ADJUSTMENT CIRCUIT, MOTOR DRIVING CONTROL CIRCUIT, AND MOTOR APPARATUS

BACKGROUND OF THE INVENTION

1. Field of the Invention

The present invention relates to a phase adjustment circuit which adjusts the phase of a sine wave signal with a first phase, a second phase and a third phase in which the phase difference between the respective phases is 120°, a motor driving control circuit which includes this phase adjustment circuit, and which controls the driving of a three-phase brushless motor such as a spindle motor or the like that causes the rotation of an optical disk, and a motor apparatus including this motor driving control circuit.

2. Description of the Related Art

Conventionally, for example, the motor apparatus disclosed in Japanese Patent Application Laid-Open No. 2002-84772 and Japanese Patent Application Laid-Open No. 2003-111481 is known as a motor apparatus of this type. This motor apparatus is shown in FIG. 4. This motor apparatus 101 includes rotational position detection elements HU, HV and HW which are Hall elements that detect the position of the rotor of the motor and output a rotational position signal, a motor driving control circuit 102 which outputs a PWM signal on the basis of the rotational position signal and a command from a motor control command part (not shown in the figures), and a power driver 103 which causes a driving current corresponding to the PWM signal to flow to the armature coils LU, LV and LW of the motor. The rotational position signal is a three-phase sine wave signal consisting of differential U phase signals $HU^+$ and $HU^-$ output by the rotational position detection element HU, differential V phase signals $HV^+$ and $HV^-$ output by the rotational position detection element HV, and differential W phase signals $HW^+$ and $HW^-$ output by the rotational position detection element HW, and the phase difference between the respective phases is 120°.

The motor driving control circuit 102 includes rotational position signal amplifiers 110 through 112 which are three Hall amplifiers that amplify the rotational position signals $HU^+$ and $HU^-$, $HV^+$ and $HV^-$, and $HW^+$ and $HW^-$ at a fixed amplification rate, and output sine wave signals $U^+$, $U^-$, $V^+$, $V^-$, $W^+$ and $W^-$, an automatic gain control (AGC) circuit 113 which advances the phase by 30° for each of the sine wave signals $U^+$, $U^-$, $V^+$, $V^-$, $W^+$ and $W^-$, and which amplifies the signals by a gain corresponding to a control voltage that is output by a torque control circuit 118 and outputs signals $U_{HL}$, $V_{HL}$ and $W_{HL}$, and three PWM output comparators 114, 115 and 116 which respectively input the signals $U_{HL}$, $V_{HL}$ and $W_{HL}$ into the non-inversion terminals, input a triangular wave from a triangular wave generator 117 into the inversion terminals (in common), and output PWM signals of the comparison results. Here, the purpose for advancing the phases of the sine wave signals $U^+$, $U^-$, $V^+$, $V^-$, $W^+$ and $W^-$ by 30° is to apply a magnetic field with a timing that causes the rotor of the motor to rotate with maximum efficiency. Furthermore, the torque control circuit 118 outputs a control voltage which controls the automatic gain control circuit 113 in accordance with the driving currents of the armature coils LU, LV and LW, and a torque control voltage TORQUE for controlling the motor rotation speed (motor rpm), which is a command from a motor control command part.

However, there is a delay arising from the wiring and the delay (element delay or circuit delay) caused by the operation of the elements and circuits making up the motor apparatus from the time that the rotational position detection elements HU, HV and HW output the rotational position signals $HU^+$, $HU^-$, $HV^+$, $HV^-$, $HW^+$ and $HW^-$ until the corresponding driving currents flow to the respective armature coils LU, LV and LW. The phases are shifted as a result of this delay, so that even if the automatic gain control circuit 113 is set at the optimal phase advance angle of 30°, the magnetic field cannot actually be applied to the rotor at the optimal timing.

Generally, the motor rpm of a spindle motor that causes an optical disk to rotate varies according to the read-out speed and write speed of the optical disk. For example, in the case of a CD-R/RW motor apparatus, read-out is performed at a motor rpm of approximately 4,000 to 10,000 rpm, and writing is performed at a motor rpm of approximately 1,000 to 2,000 rpm. Meanwhile, the above-mentioned delay of the motor apparatus is substantially constant regardless of the motor rpm, and the angle corresponding to this delay increases as the motor rpm increases. For example, if the angle is 1.5° at 1,000 rpm, the angle is approximately 9° at 6,000 rpm. Thus, if the motor rpm increases, there is a great shift from the optimal phase advance angle (30°), so that the efficiency of the motor drops. Furthermore, if the shift from the optimal phase angle is large, the waveforms of the rotational position signals $HU^+$, $HU^-$, $HV^+$, $HV^-$, $HW^+$ and $HW^-$ are distorted, and the waveforms of the driving currents of the corresponding armature coils LU, LV and LW are also distorted, so that the noise generated by the motor increases.

SUMMARY OF THE INVENTION

In order to overcome the problems described above, preferred embodiments of the present invention provide a phase adjustment circuit that enables fine phase adjustment of three-phase sine wave signals, a motor driving control circuit including such a novel phase adjustment circuit, which can increase the efficiency and reduce noise over a broad motor rpm range, and a motor apparatus including such a novel motor driving control circuit.

In order to resolve the problems described above, the phase adjustment circuit according to a preferred embodiment of the present invention is a phase adjustment circuit which inputs sine wave signals of a first phase, second phase and third phase in which the phase difference between the respective phases is 120°, and which adjusts the phases of these signals by a phase adjustment voltage, and outputs sine wave signals of the first phase, second phase and third phase, wherein a signal, which is obtained by computing the input sine wave signal of the first phase with the input sine wave signal of the second phase or third phase multiplied by a ratio corresponding to the phase adjustment voltage, is output as the sine wave signal of either phase, a signal, which is obtained by computing the input sine wave signal of the second phase with the input sine wave signal of the third phase or first phase multiplied by the ratio, is output as the sine wave signal of either phase, and a signal, which is obtained by computing the input sine wave signal of the third phase with the input sine wave signal of the first phase or second phase multiplied by the ratio, is output as the sine wave signal of either phase.

Preferably, this phase adjustment circuit outputs a signal obtained by subtracting an inverted signal of the input sine wave signal of the second phase multiplied by the ratio from an inverted signal of the input sine wave signal of the first phase, as the sine wave signal of the second phase, outputs a signal obtained by subtracting an inverted signal of the input sine wave signal of the third phase multiplied by the ratio from an inverted signal of the input sine wave signal of the second phase, as the sine wave signal of the third phase, and outputs a signal obtained by subtracting an inverted signal of the input sine wave signal of the first phase multiplied by the ratio from an inverted signal of the input sine wave signal of the third phase, as the sine wave signal of the first phase.

Preferably, this phase adjustment circuit outputs a signal obtained by synthesizing a current which corresponds to an inverted signal of the input sine wave signal of the first phase, a current which flows in the opposite direction from this current and which corresponds to an inverted signal of the input sine wave signal of the second phase multiplied by the ratio, and a DC current which corrects the difference in the DC levels of these currents, as the sine wave signal of the second phase, a signal obtained by synthesizing a current which corresponds to an inverted signal of the input sine wave signal of the second phase, a current which flows in the opposite direction from this current and which corresponds to an inverted signal of the input sine wave signal of the third phase multiplied by the ratio, and a DC current which corrects the difference in the DC levels of these currents, as the sine wave signal of the third phase, and a signal obtained by synthesizing a current which corresponds to an inverted signal of the input sine wave signal of the third phase, a current which flows in the opposite direction from this current and which corresponds to an inverted signal of the input sine wave signal of the first phase multiplied by the ratio, and a DC current which corrects the difference in the DC levels of these currents, as the sine wave signal of the first phase.

The motor driving control circuit according to a preferred embodiment of the present invention includes a rotational position signal amplifier which inputs and amplifies rotational position signals of the U phase, V phase and W phase, the phase adjustment circuit described above which inputs the U phase, V phase and W phase signals output by the rotational position signal amplifier as the sine wave signals of the first phase, second phase and third phase, and an automatic gain control circuit which inputs the U phase, V phase and W phase signals output by the phase adjustment circuit and the gain of which is feedback-controlled in accordance with the driving currents of the armature coils of the motor.

Preferably, the motor driving control circuit also includes a pulse train generating circuit which produces a periodic pulse train in accordance with at least any of the rotational position signals of the U phase, V phase and W phase, and a frequency-voltage conversion circuit which converts the frequency of the pulse train into a corresponding voltage, and outputs this voltage as the phase adjustment voltage.

The motor apparatus according to a preferred embodiment of the present invention includes the motor driving control circuit described above, a power driver which is controlled by the motor driving control circuit and which drives the armature coils of a motor, and a rotational position detection element which detects the position of the rotor of the motor, and outputs a rotational position signal.

Since the phase adjustment circuit according to a preferred embodiment of the present invention compute two input sine wave signals using a ratio corresponding to the phase adjustment voltage and outputs the resulting signal as one of the sine wave signals, this circuit can contribute to a precise phase adjustment. Furthermore, since the motor driving control circuit and motor apparatus according to a preferred embodiment of the present invention perform a phase adjustment of the U phase, V phase and W phase via the phase adjustment circuit, the delay arising from the wiring and the delay caused by operation of the elements or circuits can be compensated for, thus making it possible to increase the efficiency of the motor apparatus and reduce noise over a broad motor rpm range by driving the motor with an optimal timing.

Other features, elements, characteristics and advantages of the present invention will become more apparent from the following detailed description of preferred embodiments of the present invention with reference to the attached drawings.

DETAILED DESCRIPTION OF THE PREFERRED EMBODIMENTS

Figure 1:
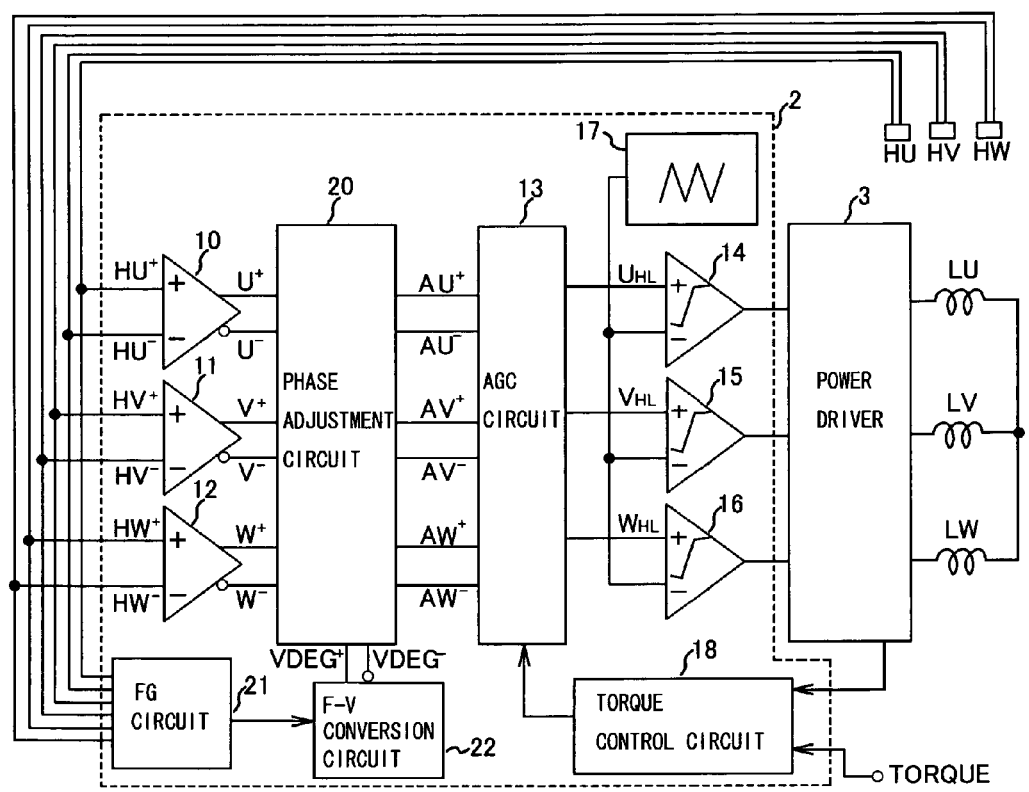
FIG. 1 is an overall structural diagram of a motor apparatus according to a preferred embodiment of the present invention.

A phase adjustment circuit, a motor driving control circuit and motor apparatus according to preferred embodiments of the present invention will be described below. As is shown in FIG. 1, the motor apparatus 1 preferably includes rotational position detection elements HU, HV and HW which preferably are Hall elements that detect the position of the rotor of the motor, and output rotational position signals, a motor driving control circuit 2 which outputs a PWM signal on the basis of the rotational position signals and the command of a motor control command part (not shown in the figures), and a power driver 3 which causes driving currents corresponding to the PWM signal to flow to the armature coils LU, LV and LW of the motor. The rotational position signals are three-phase sine wave signals including differential U phase signals $HU^+$ and $HU^-$ output by the rotational position detection element HU, differential V phase signals $HV^+$ and $HV^-$ output by the rotational position detection element HV, and differential W phase signals $HW^+$ and $HW^-$ output by the rotational position detection element HW. The phase difference between the respective phases is 120°.

The motor driving control circuit 2 preferably includes rotational position signal amplifiers 10 through 12 which preferably are three Hall amplifiers that amplify the rotational position signals $HU^+$ and $HU^-$, $HV^+$ and $HV^-$, and $HW^+$ and $HW^-$ at a fixed amplification rate, and output sine wave signals $U^+$, $U^-$, $V^+$, $V^-$, $W^+$ and $W^-$, a phase adjustment circuit 20 which performs phase adjustment by causing phase adjustment voltages $VDEG^+$ and $VDEG^-$ to operate on the sine wave signals $U^+$, $U^-$, $V^+$, $V^-$, $W^+$ and $W^-$, and which outputs sine wave signals $AU^+$, $AU^-$, $AV^+$, $AV^-$, $AW^+$ and $AW^-$, an automatic gain control (AGC) circuit 13 which inputs the sine wave signals $AU^+$, $AU^-$, $AV^+$, $AV^-$, $AW^+$ and $AW^-$, amplifies these signals by the gain according to a control voltage output by a torque control circuit 18, and outputs signals $U_{HL}$, $V_{HL}$ and $W_{HL}$, and three PWM output comparators 14, 15 and 16 which input the signals $U_{HL}$, $V_{HL}$ and $W_{HL}$ and a triangular wave from a triangular wave generator 17, and output PWM signals. This motor driving control circuit 2 also includes a pulse train generating (FG) circuit 21 which produces a periodic pulse train using at least any of the three-phase rotational position signals $HU^+$, $HU^-$, $HV^+$, $HV^-$, $HW^+$ and $HW^-$, and a frequency-voltage (F-V) conversion circuit 22 which converts the frequency of the pulse train into a voltage, and outputs phase adjustment voltages $VDEG^+$ and $VDEG^-$.

The respective parts of the motor driving control circuit 2 will be described in more specific terms below. The rotational position signal amplifier 10 is preferably a U phase differential amplifier which respectively inputs the rotational position signals $HU^+$ and $HU^-$ of the rotational position detection element HU into a non-inversion input terminal and an inversion input terminal, amplifies these signals at a fixed amplification rate, and outputs the amplified signals. The rotational position signal amplifier 11 is preferably a V phase differential amplifier which respectively inputs the rotational position signals $HV^+$ and $HV^-$ of the rotational position detection element HV into a non-inversion input terminal and an inversion input terminal, amplifies these signals at a fixed amplification rate, and outputs the amplified signals. The rotational position signal amplifier 12 is preferably a W phase differential amplifier which respectively inputs the rotational position signals $HW^+$ and $HW^-$ of the rotational position detection element HW into a non-inversion input terminal and an inversion input terminal, amplifies these signals at a fixed amplification rate, and outputs the amplified signals.

The phase adjustment circuit 20 inputs the sine wave signals output by the rotational position signal amplifiers 10 through 12, i.e., the differential U phase (first phase) signals $U^+$ and $U^-$, the differential V phase (second phase) signals $V^+$ and $V^-$, and the differential W phase (third phase) signals $W^+$ and $W^-$, performs an adjustment for these respective signals so that the phase is arbitrarily advanced by a ratio $\alpha$ (described later), and outputs U phase (first phase) signals $AU^+$ and $AU^-$, V phase (second phase) signals $AV^+$ and $AV^-$, and W phase (third phase) signal $AW^+$ and $AW^-$. As will be described later, the phase advance angle is 60° if $\alpha=0$, 30° if $\alpha=1$, and approximately 19.1° if $\alpha=2$. The amplitude is also increased with the phase advance angle, and is 1 time if $\alpha=0$, approximately 1.73 times if $\alpha=1$, and approximately 2.65 times if $\alpha=2$. Here, the ratio $\alpha$ is expressed according to the phase adjustment voltages $VDEG^+$ and $VDEG^-$; $\alpha=1$ if the difference between these voltages is zero. This 30° advance angle is a reference angle. $\alpha>1$ if the difference is negative, and the maximum $\alpha$ is 2. $\alpha<1$ if the difference is positive, and the minimum $\alpha$ is 0.

Here, an adjustment is performed in the range of $\alpha<1$ in order to set the phase advance angle at 30° (which is the optimal phase advance angle) so that compensation is made for the overall delay from the time that the rotational position signals $HU^+$, $HU^-$, $HV^+$, $HV^-$, $HW^+$ and $HW^-$ are output by the rotational position detection elements HU, HV and HW until the corresponding driving currents are caused to flow to the respective armature coils LU, LV and LW. However, there may be a need to perform an adjustment in the range of $\alpha<2$ in cases where compensation is made for a relative shift in the disposition of the rotational position detection elements HU, HV and HW with respective to the armature coils LU, LV and LW or the like.

The automatic gain control circuit 13 inputs the sine wave signals $AU^+$, $AU^-$, $AV^+$, $AV^-$, $AW^+$ and $AW^-$ that are output by the phase adjustment circuit 20, amplifies these signals by a gain corresponding to the control voltage output by the torque control circuit 18, and outputs the signals $U_{HL}$, $V_{HL}$ and $W_{HL}$. This gain is feedback-controlled via the torque control circuit 18 according to the driving currents of the armature coils LU, LV and LW.

As a result of the operation of this automatic gain control circuit 13, compensation is made for the increase in the amplitude that occurs together with the advance angle of the phase in the phase adjustment circuit 20. In other words, the amplitudes of the sine wave signals $U_{HL}$, $V_{HL}$ and $W_{HL}$ that are output by the automatic gain control circuit 13 are subjected to the abovementioned feedback control. As a result, even if the amplitudes of the sine wave signals $AU^+$, $AU^-$, $AV^+$, $AV^-$, $AW^+$ and $AW^-$ that are input are increased by the ratio $\alpha$, the abovementioned signals are unaffected by this.

The PWM output comparators 14 through 16 respectively input the signals $U_{HL}$, $V_{HL}$ and $W_{HL}$ output by the automatic gain control circuit 13 into respective non-inversion input terminals, input a triangular wave from a triangular wave generator 17 into inversion input terminals (in common), and output PWM signals resulting from a comparison of these signals, thus controlling the power driver 3. For each of the signals $U_{HL}$, $V_{HL}$ and $W_{HL}$, a U phase, V phase or W phase PWM signal in which the period for which the voltage is higher than the triangular wave is the high-level "on" period is output.

The torque control circuit 18 inputs the driving currents of the armature coils LU, LV and LW and the torque control voltage TORQUE used to control the motor rpm, and outputs a control voltage that controls the automatic gain control circuit 13. The torque control voltage TORQUE is controlled by a motor control command part (not shown in the figures) including a CPU or other suitable controller. The driving currents of the armature coils LU, LV and LW flow during the respective "on" periods of the U phase, V phase and W phase PWM signals, and vary according to the respective actual phases. The torque control circuit 18 converts these driving currents into voltages by the detected resistance, compares the peak voltages or mean voltages to the torque control voltage TORQUE, and outputs the result to the automatic gain control circuit 13.

As was described above, the pulse train generating circuit 21 produces a periodic pulse train using at least any of the three-phase rotational position signals $HU^+$, $HU^-$, $HV^+$, $HV^-$, $HW^+$ and $HW^-$. For example, if only the U phase non-inverted signal $HU^+$ is used, a pulse train equal to the frequency of this signal is produced. Furthermore, if the non-inverted signals $HU^+$, $HV^+$ and $HW^+$ of three phases are used, a pulse train of three times the frequency of these signals is produced.

The frequency-voltage conversion circuit 22 converts the frequency of the pulse train output by the pulse train generating circuit 21 into a corresponding voltage, and outputs this voltage as the phase adjustment voltages $VDEG^+$ and $VDEG^-$. As was described above, the overall delay from the time that the rotational position detection elements HU, HV and HW output the rotational position signals $HU^+$, $HU^-$, $HV^+$, $HV^-$, $HW^+$ and $HW^-$ until the corresponding driving currents flow to the respective armature coils LU, LV and LW is substantially constant regardless of the motor rpm, and the angle corresponding to this delay increases as the motor rpm increases. Accordingly, in the frequency-voltage conversion circuit 22, as the frequency of the input pulse train increases, the difference between the differential voltages $VDEG^+$ and $VDEG^-$ is increased in the positive direction so that the ratio $\alpha$ is lowered, and the advance angle of the phase adjustment circuit 20 is increased. Thus, the motor can be driven at an optimal timing in an automatic response to the motor rpm, thus making it possible to increase the efficiency of the motor apparatus and reduce noise over a broad motor rpm range.

Furthermore, for example, in cases where the variation in the motor rpm is relatively small as in a CD-R motor apparatus or the like, the pulse generating circuit 21 and frequency-voltage conversion circuit 22 may be omitted, and the phase adjustment voltages VDEG$^+$ and VDEG$^-$ may be set as fixed voltages. In this case, the fixed voltages are determined with the overall delay from the time that the rotational position detection elements HU, HV and HW output the rotational position signals HU$^+$, HU$^-$, HV$^+$, HV$^-$, HW$^+$ and HW$^-$ until the corresponding driving currents flow to the respective armature coils LU, LV and LW being taken into account.

Next, the motor rpm control operation of the motor apparatus 1 will be described. In cases where the peak voltage or mean voltage in the torque control circuit 18 is lower than the torque control voltage TORQUE, the torque control circuit 18 outputs a control voltage so that the amplitudes of the sine wave signals $U_{HL}$, $V_{HL}$ and $W_{HL}$ output by the automatic gain control circuit 13 are increased. Accordingly, in the PWM output comparators 14 through 16, PWM signals with a long "on" period are produced, and are output to the power driver 3. As a result, the power driver 3 increases the driving currents that flow to the armature coils LU, LV and LW, so that the motor rpm is increased. These driving currents are converted into voltages inside the torque control circuit 18, and the peak voltages or mean voltages are again compared with the torque control voltage. The loop of this operation is repeated, and the operation stabilizes when the peak voltages or mean voltages coincide with the torque control voltage TORQUE. Conversely, in cases where the peak voltage or mean voltage in the torque control circuit 18 is higher than the torque control voltage TORQUE, a control voltage is output so that the amplitudes of the sine wave signals $U_{HL}$, $V_{HL}$ and $W_{HL}$ output by the automatic gain control circuit 13 are reduced. Accordingly, PWM signals with a short "on" period are produced in the PWM output comparators 14 through 16 and output to the power driver 3. As a result, the driving currents that are caused to flow to the armature coils LU, LV and LW by the power driver 3 are reduced, so that the motor rpm drops. These driving currents are converted into voltages inside the torque control circuit 18, and the peak voltages or mean voltages are again compared with the torque control voltage TORQUE. The loop of this operation is repeated, and this operation stabilizes when the peak voltages or mean voltages coincide with the torque control voltage TORQUE.

Figure 2:
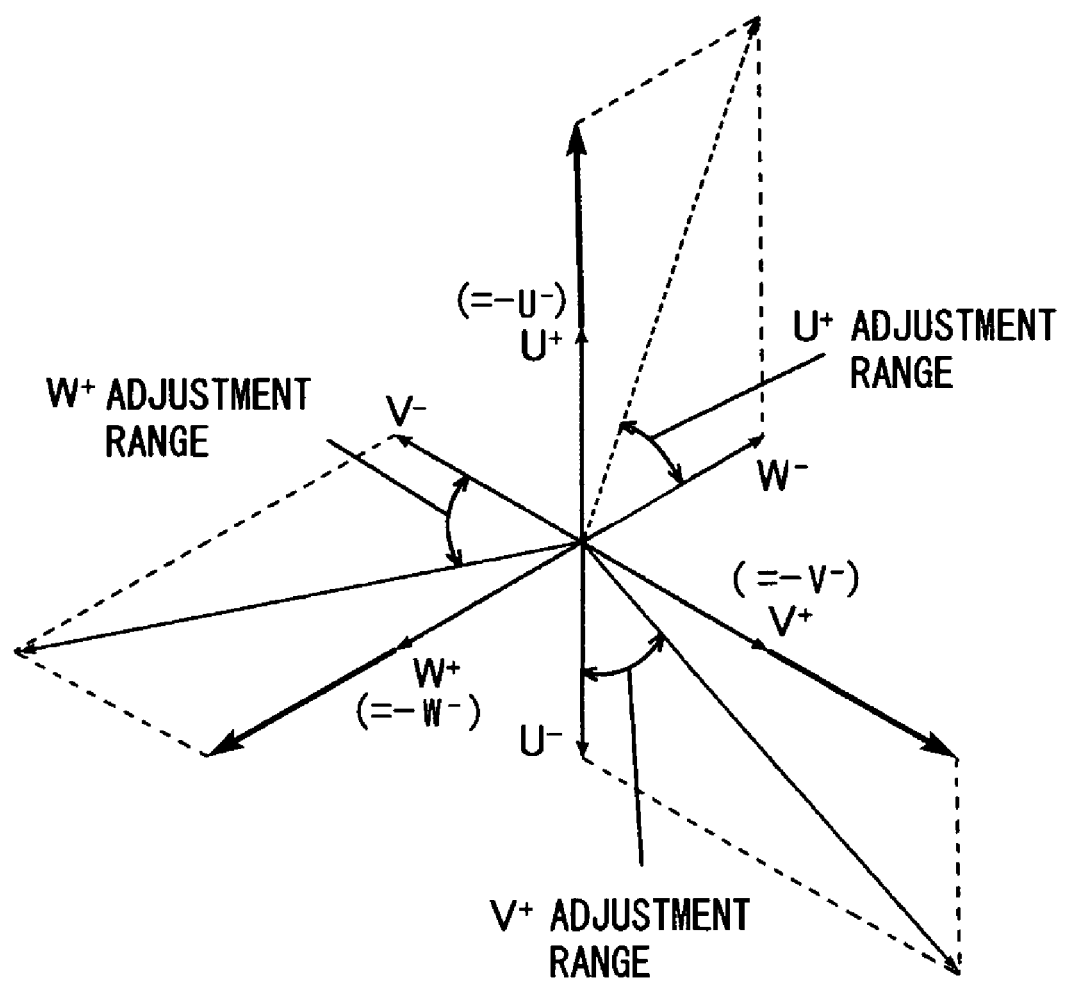
FIG. 2 is a diagram showing the operating principle of the phase adjustment circuit of the preferred embodiment of the present invention shown in FIG. 1.

Next, the operating principle of the phase adjustment circuit 20 will be described with reference to FIG. 2. In this figure; the direction in which the phase advances is taken as the clockwise direction. The V phase non-inverted signal V$^+$ is advanced by 120° with respect to the U phase non-inverted signal U$^+$, the W phase non-inverted signal W$^+$ is advanced by 120° with respect to the V phase non-inverted signal V$^+$, and the U phase non-inverted signal U$^+$ is advanced by 120° with respect to the W phase non-inverted signal W$^+$. Furthermore, the U phase inverted signal U$^-$ is in a position that is 180° from the U phase non-inverted signal U$^+$, the V phase inverted signal V$^-$ is in a position that is 180° from the V phase non-inverted signal V$^+$, and the W phase inverted signal W$^-$ is in a position that is 180° from the W phase non-inverted signal W$^+$.

For example, in order to perform an adjustment so that the U phase non-inverted signal U$^+$ is advanced by 30°, the U phase inverted signal U$^-$ is subtracted from the W phase inverted signal W$^-$ without the signal U$^-$ being amplified or attenuated (i.e., the signal U$^-$ being multiplied by a ratio of α=1). The subtraction of the U phase inverted signal U$^-$ is the same as the addition of the U phase non-inverted signal U$^+$. In order to advance the U phase non-inverted signal U$^+$ by more than 30°, the U phase inverted signal U$^-$ is subtracted from the W phase inverted signal W$^-$ after the signal U$^-$ being attenuated (i.e., the signal U$^-$ being multiplied by a ratio of α<1). Accordingly, in a case where the U phase non-inverted angle U$^+$ is advanced to 60° (as far as the W phase inverted signal W$^-$), the U phase inverted signal U$^-$ is subtracted after being attenuated to zero. Conversely, in order to advance the U phase non-inverted signal U$^+$ by less than 30°, the U phase inverted signal U$^-$ is subtracted from the W phase inverted signal W$^-$ after the signal U$^-$ being amplified (i.e., the signal U$^-$ being multiplied by a ratio of α>1). In the phase adjustment circuit 20, since the amplification of this U phase inverted signal U$^-$ is set at a maximum of 2 times, the minimum value of the advance angle is approximately 19.1°. Accordingly, the adjustment range of the U phase non-inverted signal U$^+$ in the phase adjustment circuit 20 extends from approximately 19.1° to approximately 60°. The same is true of the adjustment of the advance angles of the U phase inverted signal U$^-$ and the V phase and W phase non-inverted and inverted signals (however, the adjustment of U$^-$, V$^-$ and W$^-$ is not shown in FIG. 2). Furthermore, the amplitude is also increased with the advance angle of the phase.

Figure 3:
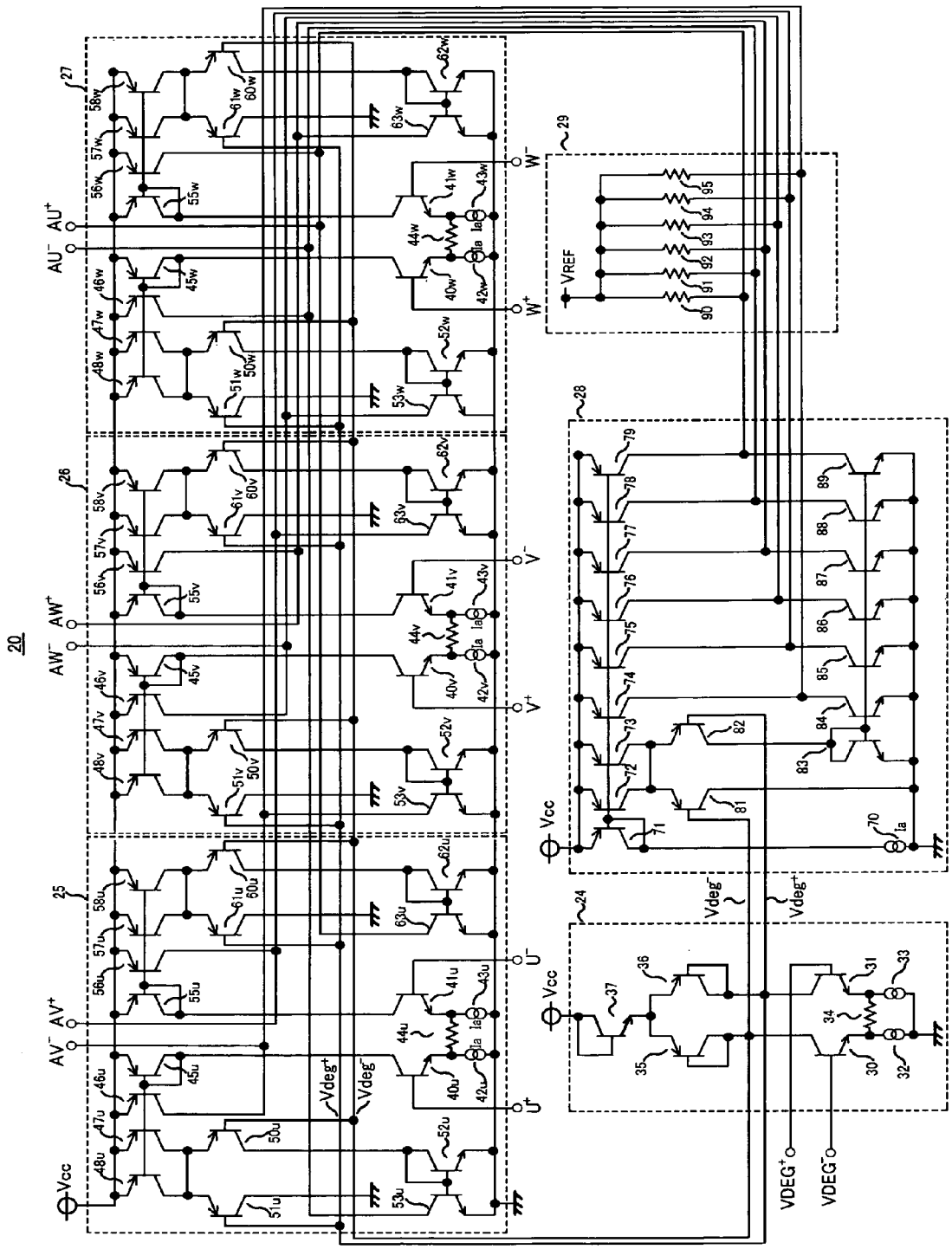
FIG. 3 is a circuit diagram of the phase adjustment diagram of the preferred embodiment of the present invention shown in FIG. 1.
Figure 4:
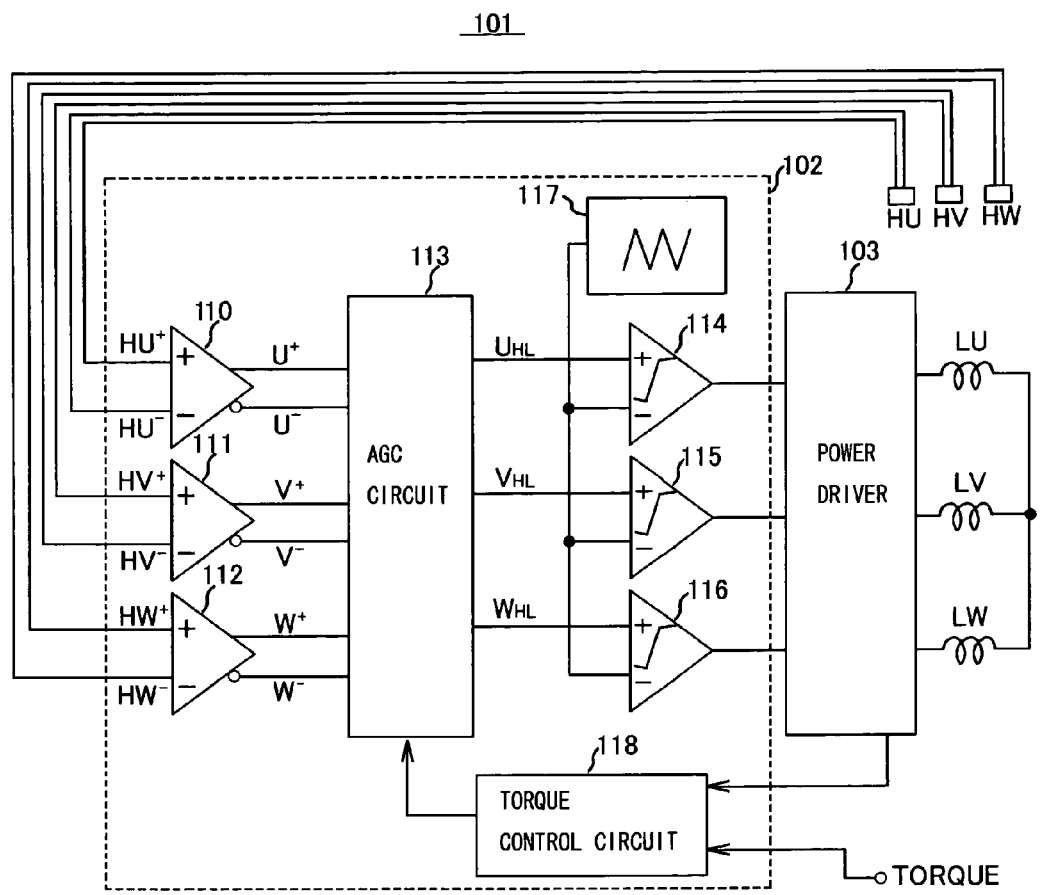
FIG. 4 is an overall structural diagram of a conventional motor apparatus.

Next, the specific circuit of the phase adjustment circuit 20 that is used to realize this operating principle will be described with reference to FIG. 3. The phase adjustment circuit 20 preferably includes a phase adjustment voltage input circuit 24, a U phase processing circuit 25, a V phase processing circuit 26, a W phase processing circuit 27, a DC level correction circuit 28, and a voltage conversion circuit 29. In these processing circuits 25, 26 and 27, currents corresponding to the difference between the respective differential signals U$^+$ and U$^-$, V$^+$ and V$^-$ or W$^+$ and W$^-$ are generated, then, currents (current of one time and current of a times) obtained by multiplying the value of the above-mentioned current by one and the ratio α are generated. The current of one time is the current in the direction of supply, i.e., the source current, and the current of α times is the current in the direction of extraction, i.e., the sink current. The subtraction is made by these currents being synthesized by specified combinations of wiring connections. For example, the current of one time corresponding to the inverted signal W$^-$ produced by the W phase processing signal 27 is supplied to the wiring connected to the AU$^+$ terminal, and the current of a times corresponding to the inverted signal U$^-$ produced by the U phase processing circuit 25 is extracted from this wiring. The DC level of the resulting synthesized current is corrected by the DC level correction circuit 28, and is converted into a voltage using the reference potential $V_{REF}$ as a reference by the voltage conversion circuit 29. The details of the circuit configuration and the operation will be described below.

The phase adjustment voltage input circuit 24 preferably includes an NPN type transistor 30 which inputs the inverted voltage VDEG$^-$ of the phase adjustment voltage into the base, an NPN type transistor 31 which inputs the non-inverted voltage VDEG$^+$ of the phase adjustment voltage into the base, a resistor 34 which is connected between the emitters of the transistors 30 and 31, constant-current sources 32 and 33 which are disposed between the respective emitters of the transistors 30 and 31 and the ground potential, PNP type transistors 35 and 36 whose respective collectors and bases are connected to the respective collectors of the transistors 30 and 31, and an NPN type transistor 37 whose emitter is connected to the mutually connected emitters of the transistors 35 and 36, and whose base and collector are connected to the power supply $V_{cc}$. An inverted voltage Vdeg⁻ and a non-inverted voltage Vdeg⁺ are respectively output from the connection point between the collector of the transistor 30 and the collector of the transistor 35, and the connection point between the collector of the transistor 31 and the collector of the transistor 36. The phase adjustment voltages VDEG⁺ and VDEG⁻ are converted by this phase adjustment voltage input circuit 24 into the voltages Vdeg⁺ and Vdeg⁻ having the input level that are subjected to the operations of the circuits 25 through 28 of the subsequent stage.

The U phase processing circuit 25 preferably includes an NPN type transistor 40u which inputs the U phase non-inverted signal U⁺ into the base, an NPN type transistor 41u which inputs the U phase inverted signal U⁻ into the base, a resistor 44u which is connected between the emitters of the transistors 40u and 41u, constant-current sources 42u and 43u with a current value of Ia which are disposed between the respective emitters of the transistors 40u and 41u and the ground potential, PNP type transistors 45u and 55u whose respective collectors and bases are connected to the respective collectors of the transistors 40u and 41u, and whose emitters are connected to the power supply $V_{cc}$, a PNP type transistor 46u which defines a current mirror circuit with the transistor 45u, PNP type transistors 47u and 48u which define a current mirror circuit with the transistor 45u, and whose collectors are connected to each other, a PNP type transistor 50u which inputs the inverted voltage Vdeg⁻ into the base, and whose emitter is connected to the collectors of the transistors 47u and 48u, a PNP type transistor 51u which inputs the non-inverted signal Vdeg⁺ into the base, whose emitter is connected to the collectors of the transistors 47u and 48u, and whose collector is grounded, an NPN type transistor 52u whose collector and base are connected to the collector of the transistor 50u, and whose emitter is grounded, an NPN type transistor 53u which defines a current mirror circuit with the transistor 52u, a PNP type transistor 56u which defines a current mirror circuit with a transistor 55u, PNP type transistors 57u and 58u which define a current mirror circuit with the transistor 55u, and whose collectors are connected to each other, a PNP type transistor 60u which inputs the inverted voltage Vdeg⁻ into the base, and whose emitter is connected to the collectors of the transistors 57u and 58u, a PNP type transistor 61u which inputs the non-inverted signal Vdeg⁺ into the base, whose emitter is connected to the collectors of the transistors 57u and 58u, and whose collector is grounded, an NPN type transistor 62u whose collector and base are connected to the collector of the transistor 60u, and whose emitter is grounded, and an NPN type transistor 63u which defines a current mirror circuit with the transistor 62u. The collector of the transistor 46u is connected to the AV⁻ output terminal, and the collector of the transistor 56u is connected to the AV⁺ output terminal. Furthermore, the collector of the transistor 53u is connected to the AU⁻ output terminal, and the collector of the transistor 63u is connected to the AU⁺ output terminal. The V phase processing circuit 26 and the W phase processing circuit 27 preferably include substantially the same circuit elements as the U phase processing circuit 25. Accordingly, a description of the internal construction of these circuits is omitted.

Next, the output voltage of the output terminal AU⁺ will be described. In the W phase processing circuit 27, the current that flows to the transistor 55w varies according to the W phase signals W⁺ and W⁻. In specific terms, if the difference between the W phase signals W⁺ and W⁻ is zero, a current of Ia flows to the transistor 55w. If the difference between the signals W⁺ and W⁻ is positive, the current that flows to the transistor 55w decreases. Conversely, if the difference between the signals W⁺ and W⁻ is negative, the current that flows to the transistor 55w increases. In other words, a sine wave current with a DC level of Ia flows to the transistor 55w in accordance with the W phase signals W⁺ and W⁻ which are sine waves. A maximum amplitude of Ia is possible as the amplitude of these sine wave currents. A current of the same value as the current of this transistor 55w also flows to the transistor 56w, and this current flows in a direction that supplies the current to the wiring that is connected to the output terminal AU⁺.

Meanwhile, in the U phase processing circuit 25 as well, a sine wave current with a DC level of Ia flows to the transistor 55u in accordance with the U phase signals U⁺ and U⁻ which are sine waves. A current of the same value as the current of this transistor 55u also flows to the transistors 57u and 58u. If the difference between the non-inverted voltage Vdeg⁺ and the inverted voltage Vdeg⁻ is zero, the current component that flows to the transistor 58u flows to the transistor 62u "as is". If the difference between the non-inverted voltage Vdeg⁺ and the inverted voltage Vdeg⁻ is negative, a portion of the current component that flows to the transistor 58u flows to the ground potential via the transistor 61u. Accordingly, the current that flows to the transistor 62u is reduced. Conversely, if the difference between the non-inverted voltage Vdeg⁺ and the inverted voltage Vdeg⁻ is positive, a portion of the current component that flows to the transistor 57u is added to the current component that flows to the transistor 58u, so that the current that flows to the transistor 62u is increased. In other words, a current that is produced by multiplying the current that flows to the transistor 55u by a ratio α corresponding to the difference between the non-inverted voltage Vdeg⁺ and the inverted voltage Vdeg⁻ flows to the transistor 62u. A current of the same value as this current of the transistor 62u flows to the transistor 63u, and this current flows in the direction of extraction from the wiring that is connected to the output terminal AU⁺.

Accordingly, if the current supplied to the wiring that is connected to the output terminal AU⁺ is greater than the current value of the current that is extracted, a positive voltage is output to the output terminal AU⁺ by the voltage conversion circuit 29 (with the reference voltage $V_{REF}$ as a reference). Conversely, if the current supplied to the wiring that is connected to the output terminal AU⁺ is smaller than the current value of the extracted current, a negative voltage is output to the output terminal AU⁺ by the voltage conversion circuit 29 (with the reference voltage $V_{REF}$ as a reference). Thus, a voltage of W⁻−αU⁻ is output from the output terminal AU⁺ (with the reference voltage $V_{REF}$ as a reference). For example, in a case where α=0, a signal with the same phase as the W phase inverted signal W⁻ and the amplitude of one time is output. In a case where α=1, a signal with an angle that is in the center between the W phase inverted signal W⁻ and the U phase non-inverted signal U⁺ (a signal in the negative direction of the U phase inverted signal U⁻), i.e., an angle that is advanced by 30°, and with an amplitude of approximately 1.73 times, is output. In a case where α=2, signal with an angle that is advanced by approximately 19.1° from the U phase non-inverted signal U⁺, and with approximately 2.65 times the amplitude, is output.

Furthermore, while a sine wave current with a DC level of Ia flows to the transistor 56*w* in accordance with the W phase signals W⁺ and W⁻ which are sine waves, a sine wave current with a DC level of α×Ia flows to the transistor 63*u* in accordance with the U phase signals U⁺ and U⁻ which are sine waves. Accordingly, the current in the wiring that is connected to the output terminal AU⁺ has a DC level of (1−α)×Ia. The DC level correction circuit 28 that corrects this DC level will be described below.

The DC level correction circuit 28 preferably includes a constant-current source 70 with a current value of Ia, one end of which is grounded, a PNP type transistor 71 whose collector and base are connected to the other end of the constant-current source 70, and whose emitter is connected to the power supply $V_{cc}$, PNP type transistors 72 and 73 which define a current mirror circuit with the transistor 71, and whose collectors are connected to each other, PNP type transistors 74 through 79 which define a current mirror circuit with the transistor 71, a PNP type transistor 81 which inputs the inverted voltage Vdeg⁻ into the base, whose emitter is connected to the collectors of the transistors 72 and 73, and whose collector is grounded, a PNP type transistor 82 which inputs the non-inverted voltage Vdeg⁺ into the base, and whose emitter is connected to the collectors of the transistors 72 and 73, an NPN type transistor 83 whose collector and base are connected to the collector of the transistor 82, and whose emitter is grounded, and NPN type transistors 84 through 89 which define a current mirror circuit with the transistor 83, and whose collectors are respectively connected to the collectors of the transistors 74 through 79. The respective connection points between the transistors 74 through 79 and transistors 84 through 89 are connected to six output terminals such as the output terminal AU⁺ and the like.

In this DC level correction circuit 28, a current Ia flows to the transistors 71 through 79. The current that flows to the transistor 83 varies according to the difference between the non-inverted voltage Vdeg⁺ and inverted voltage Vdeg⁻, and is (2−α)×Ia. A current of the same value as the current of this transistor 83 flows to the transistors 84 through 89. Since this current is synthesized with the current Ia of the transistors 71 through 79, the DC level correction circuit 28 outputs a DC current of (α−1)×Ia. A current with a DC level of zero is produced by synthesizing this DC current with the above-mentioned current that has a DC level of (1−a)×Ia. Thus, the DC level is corrected by the DC level correction circuit 28.

Next, the voltage conversion circuit 29 will be described. The voltage conversion circuit 29 preferably includes resistors 90 through 95, one end of each of which is respectively connected to one of six output terminals such as the output terminal AU⁺ and the like, and the other end of each of which is connected in common to a reference potential $V_{REF}$. A voltage produced by multiplying the current input into the voltage conversion circuit 29 by the resistance values of the resistors 90 through 95 is output.

Thus, since the phase adjustment circuit 20 includes a phase adjustment voltage input circuit 24, a U phase processing circuit 25, a V phase processing circuit 26, a W phase processing circuit 27, a DC level correction circuit 28, and a voltage conversion circuit 29, the ratio α is adjusted according to the phase adjustment voltages VDEG⁺ and VDEG⁻, then, a signal obtained by subtracting the inverted signal (i.e., U⁻) of the U phase non-inverted signal U⁺ multiplied by the ratio α from the inverted signal (i.e., W⁻) of the W phase non-inverted signal W⁺ is output as the U phase non-inverted signal AU⁺, a signal obtained by subtracting the inverted signal (i.e., V⁻) of the V phase non-inverted signal V⁺ multiplied by the ratio α from the inverted signal (i.e., U⁻) of the U phase non-inverted signal U⁺ is output as the V phase non-inverted signal AV⁺, and a signal obtained by subtracting the inverted signal (i.e., W⁻) of the W phase non-inverted signal W⁺ multiplied by the ratio α from the inverted signal (i.e., V⁻) of the V phase non-inverted signal V⁺ is output as the W phase non-inverted signal AW⁺. Furthermore, a signal obtained by subtracting the inverted signal (i.e., U⁺) of the U phase inverted signal U⁻ multiplied by the ratio α from the inverted signal (i.e., W⁺) of the W phase inverted signal W⁻ is output as the U phase inverted signal AU⁻, a signal obtained by subtracting the inverted signal (i.e., V⁺) of the V phase inverted signal V⁻ multiplied by the ratio α from the inverted signal (i.e., U⁺) of the U phase inverted signal U⁻ is output as the V phase inverted signal AV⁻, and a signal obtained by subtracting the inverted signal (i.e., W⁺) of the W phase inverted signal W⁻ multiplied by the ratio α from the inverted signal (i.e., V⁺) of the V phase inverted signal V⁻ is output as the W phase inverted signal AW⁻.

The present invention is not limited to the preferred embodiments described above. Various design modifications are possible within the scope of the following claims. For example, the phase adjustment circuit 20 described in the preferred embodiments is preferably a circuit in which three-phase differential signals and differential voltages used for phase adjustment are input, these three phases are adjusted, and three-phase differential signals AU⁺, AU⁻, AV⁺, AV⁻, AW⁺ and AW⁻ are output. However, a circuit that outputs only the three-phase non-inverted signals AU⁺, AV⁺ and AW⁺ is also possible. In this case, compared to the output of differential signals, there may be a drop in the precision of the sine waves processed by subsequent circuits, i.e., the automatic gain control circuit 13 and the like, due to input offset of these circuits. However, the circuit scale of the phase adjustment circuit 20 can be reduced. Furthermore, the DC level correction circuit 28 is arranged so as to simplify the construction of the input stage of the automatic gain control circuit 13. However, it would also be possible to omit the DC level correction circuit 28 of the phase adjustment circuit 20 by installing a similar circuit in the input stage of the automatic gain control circuit 13, or installing a circuit with an AC input via a coupling capacitor which has a large capacity. Furthermore, the voltage conversion circuit 29 can be omitted by installing a similar circuit in the input stage of the automatic gain control circuit 13, or by installing a circuit that inputs the current immediately following the automatic gain control circuit 13.

Furthermore, the operating principle of the abovementioned phase adjustment circuit 20 can be realized by a relatively simple circuit described above. However, another operating principle which may be realized by a complex circuit, e.g., a circuit in which the output signal AU⁺ is produced by a computation on the U phase non-inverted signal U⁺ and the V phase non-inverted signal V⁺ can also be used.

What is claimed is:

1. A phase adjustment circuit which inputs sine wave signals of a first phase, second phase and third phase in which a phase difference between the respective first, second and third phases is 120°, and which adjusts the phases of the sine wave signals by a phase adjustment voltage, and outputs sine wave signals of the first phase, second phase and third phase, wherein a signal, which is obtained by computing the input sine wave signal of the first phase with the input sine wave signal of the second phase or third phase multiplied by a ratio corresponding to the phase adjustment voltage, is output as the sine wave signal of one of the first, second and third phases; a signal, which is obtained by computing the input sine wave signal of the second phase with the input sine wave signal of the third phase or first phase multiplied by said ratio, is output as the sine wave signal of one of the first, second and third phases; and a signal, which is obtained by computing the input sine wave signal of the third phase with the input sine wave signal of the first phase or second phase multiplied by said ratio, is output as the sine wave signal of one of the first, second and third phases.

2. The phase adjustment circuit according to claim 1, wherein the phase adjustment circuit outputs a signal obtained by subtracting an inverted signal of the input sine wave signal of the second phase multiplied by said ratio from an inverted signal of the input sine wave signal of the first phase, as the sine wave signal of the second phase; outputs a signal obtained by subtracting an inverted signal of the input sine wave signal of the third phase multiplied by said ratio from an inverted signal of the input sine wave signal of the second phase, as the sine wave signal of the third phase; and outputs a signal obtained by subtracting an inverted signal of the input sine wave signal of the first phase multiplied by said ratio from an inverted signal of the input sine wave signal of the third phase, as the sine wave signal of the first phase.

3. The phase adjustment circuit according to claim 1, wherein the phase adjustment circuit outputs a first signal obtained by synthesizing a first current which corresponds to an inverted signal of the input sine wave signal of the first phase, a second current which flows in the opposite direction and which corresponds to an inverted signal of the input sine wave signal of the second phase multiplied by said ratio, and a DC current which corrects the difference in the DC levels of the first and second currents, as the sine wave signal of the second phase; a second signal obtained by synthesizing a third current which corresponds to an inverted signal of the input sine wave signal of the second phase, a fourth current which flows in the opposite direction and which corresponds to an inverted signal of the input sine wave signal of the third phase multiplied by said ratio, and a DC current which corrects the difference in the DC levels of the third and fourth currents, as the sine wave signal of the third phase; and a third signal obtained by synthesizing a fifth current which corresponds to an inverted signal of the input sine wave signal of the third phase, a sixth current which flows in the opposite direction and which corresponds to an inverted signal of the input sine wave signal of the first phase multiplied by said ratio, and a DC current which corrects the difference in the DC levels of the fifth and sixth currents, as the sine wave signal of the first phase.

4. The phase adjustment circuit according to claim 1, wherein said phase adjustment voltage has a constant value.

5. The phase adjustment circuit according to claim 1, wherein said phase adjustment voltage has a variable value.

6. The phase adjustment circuit according to claim 1, wherein the phases of the input sine wave signals of the first, second and third phases are arbitrarily advanced by a phase advance angle determined based on said ratio, wherein said phase advance angle ranges from approximately 19.1 to approximately 60°.

7. The phase adjustment circuit according to claim 6, wherein said phase advance angle is about 60° if said ratio is equal to 0, is about 30° if said ratio is equal to 1, and is about 19.1° if said ratio is equal to 2.

8. The phase adjustment circuit according to claim 6, wherein amplitudes of the input sine wave signals of the first, second and third phases are increased with the phase advance angle.

9. The phase adjustment circuit according to claim 8, wherein the increase in the amplitudes is 1 time if said ratio is equal to 0, approximately 1.73 times if said ratio is equal to 1, and approximately 2.65 times if said ratio is equal to 2.

10. The phase adjustment circuit according to claim 1, comprising a phase adjustment voltage input circuit, a U-phase processing circuit, a V-phase processing circuit, and a W-phase processing circuit.

11. The phase adjustment circuit according to claim 10, further comprising a DC level correction circuit and a voltage conversion circuit.

12. The phase adjustment circuit according to claim 10, wherein the phase adjustment voltage input circuit includes a plurality of NPN type transistors, a plurality of PNP type transistors and at least one resistor.

13. The phase adjustment circuit according to claim 10, wherein each of the U-phase processing circuit, the V-phase processing circuit and the W-phase processing circuit includes a plurality of NPN type transistors, a plurality of PNP type transistors, and at least one resistor.

14. The phase adjustment circuit according to claim 11, wherein the DC level correction circuit includes a constant-current source, a plurality of PNP type transistors and a plurality of NPN type transistors.

15. The phase adjustment circuit according to claim 11, wherein the voltage conversion circuit includes a plurality of resistors.

16. The phase adjustment circuit according to claim 1, wherein said ratio is adjusted according to at least two of the phase adjustment voltages.

17. A motor driving control circuit for a motor, comprising:
a rotational position signal amplifier which inputs and amplifies rotational position signals of the U phase, V phase and W phase;
the phase adjustment circuit according to claim 1, which inputs the U phase, V phase and W phase signals output by the rotational position signal amplifier as the sine wave signals of the first phase, second phase and third phase; and
an automatic gain control circuit which inputs the U phase, V phase and W phase signals output by the phase adjustment circuit, and the gain of which is feedback-controlled in accordance with the driving currents of the armature coils of the motor.

18. The motor driving control circuit according to claim 17, further comprising:
a pulse train generating circuit which produces a periodic pulse train in accordance with at least any of the rotational position signals of the U phase, V phase and W phase; and
a frequency-voltage conversion circuit which converts the frequency of the pulse train into a corresponding voltage, and outputs this voltage as said phase adjustment voltage.

19. A motor apparatus comprising:
the motor driving control circuit according to claim 17;
a power driver which is controlled by the motor driving control circuit and which drives the armature coils of the a motor; and
a rotational position detection element which detects the position of the rotor of the motor, and outputs a rotational position signal.

20. A motor apparatus comprising:

the motor driving control circuit according to claim 18;

a power driver which is controlled by the motor driving control circuit and which drives the armature coils of the a motor; and a rotational position detection element which detects the position of the rotor of the motor, and outputs a rotational position signal.

* * * * *